(No Model.)
G. W. HAUPT.
HAND PLANTER.
No. 433,288.  Patented July 29, 1890.
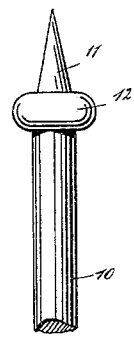
Fig: 1.
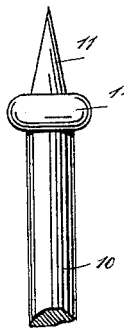
Fig: 2.
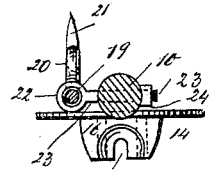
Fig: 3.
Fig: 4.
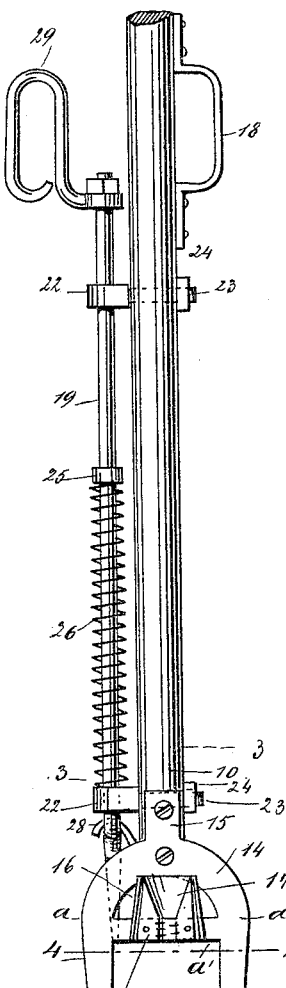
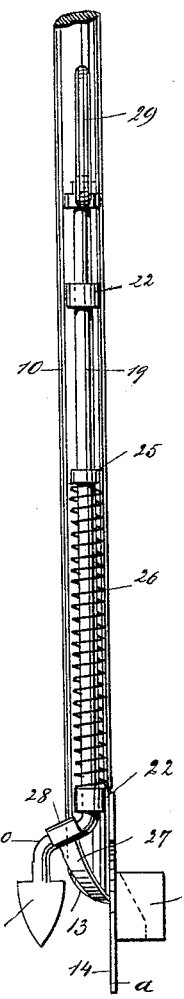
WITNESSES:
Chas. Nida.
C. Sedgwick.
INVENTOR:
G. W. Haupt
BY Munn & Co.
ATTORNEYS

UNITED STATES PATENT OFFICE.

GEORGE W. HAUPT, OF GERMANTOWN, OHIO.

HAND-PLANTER.

SPECIFICATION forming part of Letters Patent No. 433,288, dated July 29, 1890.

Application filed March 10, 1890. Serial No. 343,351. (No model.)

*To all whom it may concern:*

Be it known that I, GEORGE W. HAUPT, of Germantown, in the county of Montgomery and State of Ohio, have invented a new and useful Improvement in Hand-Planters, of which the following is a full, clear, and exact description.

My invention relates to an improvement in hand-planters especially adapted for setting out tobacco, cabbage, and similar plants, and has for its object to provide a light, durable, and simple device whereby without stooping the farmer may expeditiously set the plants in the ground and press the surrounding earth in close contact with their roots.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a front elevation of the implement. Fig. 2 is a side elevation of the same. Fig. 3 is a transverse section on line 3 3 of Fig. 1, illustrating the shovel as in its elevated or normal position; and Fig. 4 is a transverse section on line 4 4 of Fig. 1, the shovel being illustrated in position to force the earth in contact with the roots of the plant to be set.

The body 10 of the device is preferably made of a light yet strong wood, having a cylindrical exterior, and the upper end of the body is made conical, as illustrated at 11 in Figs. 1 and 2, a collar or circumferential rib 12 being produced upon said body at the commencement of the cone. The bottom of the body is provided with a beveled or curved surface 13 at its rear side, and upon the front of the body, at the bottom thereof, an essentially horseshoe or cresent shaped plate 14 is secured, the said plate at its upper central portion being preferably provided with an extension 15, whereby it may be most securely attached to the body, the attachment being effected through the medium of screws or equivalent fastening devices, as shown in Fig. 1. The members $a$ of the horseshoe-shaped plate are connected by a transverse bar $a'$, which bar is preferably integral with said members, as is likewise best shown in Fig. 1.

To the cross-bar $a'$ of the plate 14, and likewise to the upper or bow section of said plate, a plant-holder 16 is firmly secured. This plant-holder preferably consists of a block of rubber, in the front of which an essentially-funnel-shaped recess 17 is produced, which recess extends from top to bottom of the block, the flaring portion being at the top.

At one side of the body, preferably at the left-hand side, between its ends, a strap-handle 18 is bolted or otherwise attached, and upon the right-hand side of the body a rod 19 is held to slide, which rod extends from a point near the center parallel with the body and below the lower end of the same, the lower portion of the rod being formed with a crank-arm 20, as best shown in Fig. 2, to the lower end of which crank-arm a shovel 21, preferably spade-shaped, is attached or formed integral therewith.

In forming the crank-arm 20 the rod is carried, essentially, at a right angle outward and then perpendicularly downward. The shovel-rod 19 is held to turn in the eyes 22 of bolts 23, which bolts are passed through the body and are held in place by suitable nuts 24. The rod 19 between its ends has formed thereon a collar 25, and a spring 26 is coiled around the rod, having a bearing at its upper end against the collar 25 and at its lower end upon the lowest eye 22.

To the bottom of the body 10, at the right-hand side, a metal strap or casting 27 is firmly secured, which strap or casting is carried upward, following the curved or beveled contour of the lower end of the body, and is made to terminate at its upper end in a hook 28, and when the rod 19 is in its normal position the horizontal section of the crank-arm of the rod contacts with the under face of the hook 28, being held in such position by the expansion of the spring 26, whereupon the shovel is located at the rear, its edge being at a right angle to the back of the plate 14, as illustrated in Fig. 2, and as is also shown in Fig. 3.

In the operation of planting the hole is made in the ground to receive the plant by turning the body bottom up and forcing the conical upper end thereof into the earth, which leaves an opening, as shown at $b$ in dotted lines, Fig. 4, the rib 12 serving as a guide for the depth of the hole. When the apparatus is in this position, the farmer places a plant in the funnel-shaped recess of the holder 16 in such manner that the roots of the plant will extend up beyond the cross-bar $a'$ the distance that they are to be buried. The operation of placing the plant in the holder almost simultaneously with creating the hole in the ground may be easily accomplished if the farmer carries with him the plants in, for instance, a bag suspended from the shoulders or secured at the waist. The next operation, the plant being in the holder, is to again invert the body 10 and force the members of the plate 14 into the ground at each side of the hole, as shown in Fig. 4, whereupon the roots of the plant are introduced into the hole, and the said members force the earth at the sides in contact with the plant. The next operation is to force the rod 19 downward, a handle 29 being attached to its upper end for that purpose until the spade has been forced almost entirely into the ground. The handle of the rod is then carried in the direction of the rear, whereby the shovel is made to move to the front immediately behind the plant, and the earth is thereby crowded into engagement with the roots of the plant and the said plant held in an upright position. Immediately upon releasing the handle of the rod 19 the spring 26 acts and the angle-arm of the rod is drawn up the inclined plane of the strap or casting 27 until it engages with the hook 28, which is its normal position. These operations are repeated in setting each plant, and the operator by practice is enabled to set the plants quicker, and certainly with much less fatigue, by the use of this planter than by the process ordinarily employed.

Having thus described my invention, I claim as new and desire to secure by Letters Patent—

1. In a hand-planter, the combination, with a body having a conical upper end, of an essentially-horseshoe-shaped plate secured to its lower end, a plant-holder attached to the said plate, and a spring-pressed shovel adapted for vertical and lateral movement, substantially as shown and described, and for the purposes specified.

2. In a hand-planter, the combination, with a body having an essentially-horseshoe-shaped plate attached to its lower end, and a rubber plant-holder secured to the said plate between its members, of a rod loosely mounted in bearings attached to the body and capable of vertical movement against the action of a spring, and a shovel secured to the lower end of said rod, substantially as shown and described, and for the purpose specified.

3. In a hand-planter, the combination, with a body having its lower end rearwardly beveled and provided with an essentially-horseshoe-shaped plate attached to its front at the bottom, of an elastic plant-holder secured to the said plate between the members thereof and provided with an essentially-funnel-shaped recess, a rod held to turn in bearings upon the body provided with a crank-arm at its lower end, a spring encircling said rod, and a shovel attached to the lower end of the rod immediately below the crank-arm, substantially as shown and described.

4. In a hand-planter, the combination, with a body provided with an upper tapering end and a rib near the said tapering end, the lower end of which body is rearwardly beveled or curved, of an essentially-horseshoe-shaped plate attached to the front of the body at its lower end, an elastic plant-holder secured to the said plate between its members and provided with an essentially-funnel-shaped recess in its front face, a rod held to turn in bearings secured to one side of the body and having a crank-arm formed near its lower end and a shovel attached to its lower extremity, a spring coiled around the said rod and bearing against the shoulder thereon and one of its bearings, and a hook attached to the lower end of the body above its beveled surface, adapted as a keeper for the shovel-carrying rod, substantially as shown and described, and for the purpose specified.

GEORGE W. HAUPT.

Witnesses:
DAVID ROHRER,
ADAM FRANK.